United States Patent
Wu et al.

(10) Patent No.: US 12,306,992 B2
(45) Date of Patent: May 20, 2025

(54) ANONYMITY ALGORITHM-BASED DATA SHARING PRIVACY PROTECTION METHOD

(71) Applicant: Institute of Medical Information, Chinese Academy of Medical Sciences, Beijing (CN)

(72) Inventors: Sizhu Wu, Beijing (CN); Mingkun Tang, Beijing (CN); Qing Qian, Beijing (CN)

(73) Assignee: Institute of Medical Information, Chinese Academy of Medical Sciences, Beijing (CN)

( * ) Notice: Subject to any disclaimer, the term of this patent is extended or adjusted under 35 U.S.C. 154(b) by 0 days.

(21) Appl. No.: 18/779,132

(22) Filed: Jul. 22, 2024

(65) Prior Publication Data

US 2025/0053686 A1 Feb. 13, 2025

(30) Foreign Application Priority Data

Aug. 4, 2023 (CN) .......................... 202310980143.2

(51) Int. Cl.
*G06F 21/62* (2013.01)
(52) U.S. Cl.
CPC ................................ *G06F 21/6254* (2013.01)
(58) Field of Classification Search
CPC .................................................. G06F 21/6254
See application file for complete search history.

(56) References Cited

U.S. PATENT DOCUMENTS

| 12,099,485 B1* | 9/2024 | Swamy ............... G06F 16/3328 |
| 2003/0023715 A1 | 1/2003 | Reiner et al. |

(Continued)

FOREIGN PATENT DOCUMENTS

CN 107273757 A 10/2017

OTHER PUBLICATIONS

Qinghua Wu, Research on Trajectory Data Compression and Privacy Preserving Technology, Professional Degree Master's Thesis, 2017, pp. 1-55.

(Continued)

*Primary Examiner* — Stephen T Gundry
(74) *Attorney, Agent, or Firm* — Bayramoglu Law Offices LLC

(57) ABSTRACT

The provided is an anonymity algorithm-based data sharing privacy protection method. The method includes: identifying and merging an attribute that requires privacy protection, and specifying an anonymity processing object; performing first clustering by a MSAK anonymity algorithm to divide an original data set into a plurality of first subdata sets, and separating an outlier of each of the first subdata sets to form second subdata sets and a first tuple set to be allocated; performing second clustering on each of the second subdata sets to generate a plurality of clustering clusters including similar tuples, and determining the sizes of the clustering clusters and clipping distant tuples to form a first clustering cluster set, a second clustering cluster set and a second tuple set to be allocated; and performing third clustering, allocating all tuples to be allocated, and replacing all the tuples in the clustering clusters with clustering centers.

10 Claims, 10 Drawing Sheets

(56) References Cited

U.S. PATENT DOCUMENTS

| | | | |
|---|---|---|---|
| 2013/0086068 A1 | 4/2013 | Davids | |
| 2019/0156061 A1* | 5/2019 | Chakraborty | H04Q 30/0421 |
| 2019/0213357 A1* | 7/2019 | Hapfelmeier | G06F 16/906 |
| 2019/0228035 A1* | 7/2019 | Riggs | G06F 16/906 |
| 2019/0339669 A1* | 11/2019 | Coffman | G06N 3/126 |
| 2019/0370308 A1* | 12/2019 | Riggs | G06F 17/142 |
| 2019/0384604 A1* | 12/2019 | Dehon | G06F 15/78 |
| 2019/0392075 A1* | 12/2019 | Han | G06F 16/285 |
| 2020/0004749 A1* | 1/2020 | Slezak | G06N 5/01 |
| 2020/0019585 A1* | 1/2020 | Balu | G06F 16/287 |
| 2020/0019815 A1* | 1/2020 | Balu | G06F 18/24137 |
| 2020/0111030 A1* | 4/2020 | Starosta | G06N 5/01 |
| 2020/0250566 A1* | 8/2020 | Majumdar | G06N 10/60 |
| 2021/0019557 A1* | 1/2021 | Jothi | G06F 18/23213 |
| 2021/0064593 A1* | 3/2021 | Yeddu | G06F 16/285 |
| 2021/0150269 A1 | 5/2021 | Choudhury et al. | |
| 2021/0200901 A1* | 7/2021 | Vemula | G06F 18/2323 |
| 2021/0210170 A1* | 7/2021 | Gardner | G16H 70/40 |
| 2021/0342546 A1 | 11/2021 | Beigi et al. | |
| 2022/0138280 A1* | 5/2022 | Riggs | G06F 16/24578 707/737 |
| 2022/0188700 A1* | 6/2022 | Khavronin | G06Q 30/0201 |
| 2022/0277097 A1* | 9/2022 | Cabot | H04W 12/02 |
| 2022/0300651 A1* | 9/2022 | Mondal | G06F 21/6254 |
| 2022/0343000 A1* | 10/2022 | Saurabh | G06F 17/12 |
| 2022/0343019 A1* | 10/2022 | Jensen | G06F 16/282 |
| 2022/0398460 A1* | 12/2022 | Dalli | G06F 18/2163 |
| 2023/0058906 A1* | 2/2023 | Jansen | G06F 21/6254 |
| 2023/0274183 A1* | 8/2023 | Mauser | G06F 21/6245 706/12 |
| 2023/0315558 A1* | 10/2023 | Saxena | G06F 16/211 707/755 |
| 2023/0359770 A1* | 11/2023 | McFall | H04L 9/3247 |
| 2024/0028621 A1* | 1/2024 | Rausch | G06F 16/2428 |
| 2024/0046318 A1* | 2/2024 | Muriqi | G06Q 20/389 |
| 2024/0070458 A1* | 2/2024 | Charnock | G06N 3/08 |
| 2024/0152836 A1* | 5/2024 | Edwards | G06F 40/40 |
| 2024/0303373 A1* | 9/2024 | Bijon | G06F 21/6245 |

OTHER PUBLICATIONS

Tang Mingkun, et al., Study on Key Technologies of Clustering-based Anonymization Algorithm in Medical Data Sharing Privacy Protection, Journal of Medical Informatics, 2023, pp. 65-78, vol. 44. No.6.

Gaoming Yang, et al., An Enhanced I-Diversity Privacy Preservation, 2013 10th International Conference on Fuzzy Systems and Knowledge Discovery (FSKD), IEEE, 2013, pp. 1115-1120.

* cited by examiner

|  | Novel coronavirus infection | Pulmonary abscess | Pleurisy | Cold | Severe acute respiratory syndrome |
|---|---|---|---|---|---|
| Novel coronavirus infection | 0 | 0.75 | 0.75 | 0.75 | 0.17 |
| Pulmonary abscess | 0.75 | 0 | 0.5 | 0.5 | 0.5 |
| Pleurisy | 0.75 | 0.5 | 0 | 0.5 | 0.5 |
| Cold | 0.75 | 0.5 | 0.5 | 0 | 0.5 |
| Severe acute respiratory syndrome | 0.17 | 0.5 | 0.5 | 0.5 | 0 |

FIG. 4

| | age | workclass | education-num | marital-status | occupation | race | sex | native-country | disease (ICD10) |
|---|---|---|---|---|---|---|---|---|---|
| 1 | 40 | Private | 13 | Never-married | Prof-specialty | White | Female | United-States | G4700 |
| 2 | 23 | Private | 9 | Never-married | Adm-clerical | White | Female | United-States | E785 |
| 3 | 52 | Private | 12 | Married-civ-spouse | Exec-managerial | White | Male | United-States | D649 |
| 4 | 35 | Private | 14 | Married-civ-spouse | Prof-specialty | White | Female | United-States | E785 |
| 5 | 21 | Private | 10 | Never-married | Sales | White | Female | United-States | M183 |
| 6 | 18 | Private | 10 | Never-married | Other-service | White | Female | United-States | D62 |
| 7 | 48 | Private | 16 | Married-civ-spouse | Prof-specialty | Asian-Pac-Islander | Male | India | F419 |
| 8 | 22 | Private | 9 | Divorced | Machine-op-inspct | White | Female | United-States | N390 |
| 9 | 26 | Private | 10 | Married-civ-spouse | Adm-clerical | White | Male | United-States | E875 |
| 10 | 39 | Private | 10 | Married-civ-spouse | Sales | White | Male | Philippines | I480 |
| 11 | 27 | Private | 6 | Married-civ-spouse | Craft-repair | White | Male | United-States | K219 |
| 12 | 53 | Local-gov | 10 | Married-civ-spouse | Protective-serv | White | Male | United-States | E871 |
| 13 | 19 | Private | 10 | Never-married | Handlers-cleaners | White | Male | United-States | K219 |
| 14 | 33 | Private | 15 | Married-civ-spouse | Prof-specialty | White | Male | United-States | I10 |
| 15 | 39 | Private | 8 | Divorced | Sales | White | Female | United-States | F419 |
| 16 | 36 | Private | 7 | Never-married | Machine-op-inspct | White | Female | United-States | K219 |
| 17 | 40 | Private | 9 | Married-civ-spouse | Sales | White | Male | United-States | E860 |
| 18 | 90 | Private | 4 | Married-civ-spouse | Machine-op-inspct | White | Male | United-States | G4700 |
| 19 | 47 | 1f-emp-not-i | 13 | Divorced | Exec-managerial | Asian-Pac-Islander | Male | Japan | J449 |

FIG. 8

| | age | workclass | education-num | marital-status | occupation | race | sex | native-country | disease (ICD10) |
|---|---|---|---|---|---|---|---|---|---|
| 2 | 30, 41 | * | 14, 16 | Married-civ-spouse | Prof-specialty | Asian-Pac-Islander | * | China | G92 |
| 3 | 30, 41 | * | 14, 16 | Married-civ-spouse | Prof-specialty | Asian-Pac-Islander | * | China | I4891 |
| 4 | 30, 41 | * | 14, 16 | Married-civ-spouse | Prof-specialty | Asian-Pac-Islander | * | China | F419 |
| 5 | 30, 41 | * | 14, 16 | Married-civ-spouse | Prof-specialty | Asian-Pac-Islander | * | China | K219 |
| 6 | 30, 41 | * | 14, 16 | Married-civ-spouse | Prof-specialty | Asian-Pac-Islander | * | China | F329 |
| 7 | 23, 76 | Private | 3, 5 | Never-married | Handlers-cleane | White | Male | United-States | D696 |
| 8 | 23, 76 | Private | 3, 5 | Never-married | Handlers-cleane | White | Male | United-States | G8929 |
| 9 | 23, 76 | Private | 3, 5 | Never-married | Handlers-cleane | White | Male | United-States | N179 |
| 10 | 23, 76 | Private | 3, 5 | Never-married | Handlers-cleane | White | Male | United-States | D649 |
| 11 | 23, 76 | Private | 3, 5 | Never-married | Handlers-cleane | White | Male | United-States | I480 |
| 12 | 24, 44 | gov | 10, 13 | Married-civ-spouse | * | Black | Female | * | I252 |
| 13 | 24, 44 | gov | 10, 13 | Married-civ-spouse | * | Black | Female | * | K219 |
| 14 | 24, 44 | gov | 10, 13 | Married-civ-spouse | * | Black | Female | * | N189 |
| 15 | 24, 44 | gov | 10, 13 | Married-civ-spouse | * | Black | Female | * | N390 |
| 16 | 24, 44 | gov | 10, 13 | Married-civ-spouse | * | Black | Female | * | F329 |
| 17 | 36, 63 | Private | 1, 4 | * | * | Other | Male | * | I2510 |
| 18 | 36, 63 | Private | 1, 4 | * | * | Other | Male | * | F17210 |
| 19 | 36, 63 | Private | 1, 4 | * | * | Other | Male | * | I10 |
| 20 | 36, 63 | Private | 1, 4 | * | * | Other | Male | * | I4891 |
| 21 | 36, 63 | Private | 1, 4 | * | * | Other | Male | * | I10 |

ANONYMITY ALGORITHM-BASED DATA SHARING PRIVACY PROTECTION METHOD

CROSS REFERENCE TO THE RELATED APPLICATIONS

This application is based upon and claims priority to Chinese Patent Application No. 202310980143.2, filed on Aug. 4, 2023, the entire contents of which are incorporated herein by reference.

TECHNICAL FIELD

The present invention relates to the technical field of privacy protection, and in particular to an anonymity algorithm-based data sharing privacy protection method.

BACKGROUND

At present, with the development of big data and medical informatization construction, data sharing has become an important link in the big data utilization and academic research process. Medical data involves many personal life health and safety related information. How to realize effective privacy protection in the medical data sharing process is a problem worth researching and exploring. In recent years, researchers all over the world are constantly strengthening the research on the medical data sharing privacy protection, including the privacy protection of data collection, data storage and data use. The anonymization of the medical data should be completed at the data collection stage, and it is a common requirement of data privacy protection to ensure that the anonymized data cannot be recovered and cannot be re-identified or associated.

However, anonymization often leads to the great reduction of data quality. Since the medical data has the characteristics of safety, accuracy, mass, heterogeneity, complexity and the like, the existing anonymity algorithms perform poorly in the anonymization process of the medical data, resulting in more information loss.

Therefore, how to provide an anonymity algorithm-based data sharing privacy protection method, and reduce information loss and retain more data quality on the premise of meeting the privacy protection requirement as much as possible is an urgent problem for those skilled in the art.

SUMMARY

In view of this, the present invention provides an anonymity algorithm-based data sharing privacy protection method. For the characteristics of the medical data having a large data scale and many outliers and including a multi-semantic disease diagnosis attribute, the present invention improves the traditional clustering-based anonymity algorithm flow, designs a multi-semantic sensitive attribute K-Anonymity algorithm (MSAK anonymity algorithm), and aims to meet the privacy protection requirement and reduce information loss as much as possible on the basis of determining the results of key factors affecting the performance of the anonymity algorithm.

To achieve the above objective, the present invention adopts the following technical solutions: an anonymity algorithm-based data sharing privacy protection method includes:
identifying privacy-related attributes of a structured medical data set;
performing semantic standardization and merging on the identified attributes by a MSAK anonymity algorithm, constructing a multi-semantic sensitive attribute classification tree, and calculating a minimum sensitive attribute difference;
constructing a virtual initial clustering center, and performing data set clustering and dividing on the identified structured medical data set and the multi-semantic sensitive attribute classification tree to obtain first subdata sets and a sensitive attribute difference matrix;
performing outlier detection and separation on the first subdata sets to obtain second subdata sets, and a first tuple set to be allocated and composed of outliers;
setting a parameter k of a k-Anonymity model and a parameter $\ell$ of a $\ell$-Diversity model, clustering the second subdata sets, aggregating tuples of the second subdata sets into a clustering cluster, and clipping and determining the clustering cluster according to the size, the parameter k and the parameter $\ell$ of the clustering cluster to obtain a first clustering cluster set, a second clustering cluster set and a second tuple set to be allocated, where the second tuple set to be allocated is updated based on the first tuple set to be allocated;
determining whether the k-Anonymity model is met according to the number of the tuples in the clustering cluster; according to the sensitive attribute difference matrix, calculating the overall difference of sensitive attribute values of the clustering cluster, and determining whether the overall difference of the sensitive attribute values of the clustering cluster meets the $\ell$-Diversity model; and
re-allocating the tuples in the tuple set to be allocated to the first clustering cluster set and the second clustering cluster set one by one, merging and adjusting the remaining clustering clusters in the first clustering cluster set, and performing generalization and suppression to obtain an anonymized data set.

Preferably, the identifying privacy-related attributes of a structured medical data set includes: determining all attributes in the structured medical data set that are required to be anonymized, and identifying explicit identifiers, quasi-identifiers and/or sensitive attributes, and then processing the attributes respectively according to these types,
where the quasi-identifiers include numeric type quasi-identifiers and classification type quasi-identifiers;
the distance of the numeric type quasi-identifiers is measured by a method for calculating Euclidean distance, Manhattan distance or Chebyshev distance; and
the distance of the classification type quasi-identifiers is measured based on a corresponding generalization hierarchical structure tree.

Preferably, the constructing a virtual initial clustering center, and performing data set clustering and dividing on the identified structured medical data set and the multi-semantic sensitive attribute classification tree includes:
counting the value of each of the quasi-identifiers or the occurrence frequency of each attribute value; arranging the numeric type quasi-identifiers according to the numeric values in ascending order, arranging the classification type quasi-identifiers according to the occurrence frequency of each attribute value in a ratio ascending order, and forming sequences;
setting the number of the first subdata sets that are required to be divided to n, and selecting n values for each of the sequences at equal intervals;

making the value of each of the sequences corresponding to a central line of each part be a virtual initial clustering center;

comparing the distances between all the tuples in the sequences and the clustering centers, including each tuple into the closest clustering cluster, and updating the clustering center of the clustering cluster; and recording to obtain non-repetitive sensitive attribute values, calculating the difference between every two sensitive attribute values and constructing the sensitive attribute difference matrix.

The data set clustering and dividing process divides the original data set into n subdata sets with similar sizes through the first clustering.

Preferably, the process of performing outlier detection and separation on the first subdata sets includes:

converting classification attribute values of the first subdata sets into dummy variable values according to the generalization hierarchical structure;

fitting data by an isolation forest algorithm, detecting outliers of the first subdata sets, and setting an outlier ratio parameter to o;

generating an outlier set, and including the outlier set into a tuple set to be allocated to generate a first tuple set to be allocated; and separating data in the outlier set from the first subdata sets to generate second subdata sets.

The outlier detection and separation process is performed in all the first subdata sets generated in the data clustering and dividing process. The isolation forest algorithm has low time complexity and can reduce the influence of the outlier detection and separation process on the execution efficiency of the anonymity algorithm, so the MSAK anonymity algorithm detects and separates the outliers of these subdata sets by the isolation forest algorithm.

The outlier detection and separation process is performed in each of the first subdata sets independently without interference. The execution efficiency of the algorithm can be improved by performing parallel processing on each of the first subdata sets.

Meanwhile, it is necessary to determine the outlier ratio parameter in combination with the characteristics of the quasi-identifiers of the structured medical data set. When there are many quasi-identifiers with large heterogeneity in the structured medical data set, the outlier ratio parameter can be increased appropriately. When there are many time type quasi-identifiers with small heterogeneity in the structured medical data set, the outlier ratio parameter can be reduced appropriately.

Preferably, the process of clustering the second subdata sets includes:

randomly selecting f tuples in the second subdata sets as clustering centers;

comparing the distances between the remaining tuples and all the clustering centers, including the tuples into the closest clustering cluster, and updating the clustering center of the clustering cluster;

for each clustering cluster, if the size of the clustering cluster is less than the parameter k, including the clustering cluster into the first clustering cluster set;

if the size of the clustering cluster is greater than the parameter k, separating distant tuples, retaining k tuples and determining whether the k tuples meet the $\ell$-Diversity model; including the k tuples into the second clustering cluster set if the k tuples meet the $\ell$-Diversity model, and including the k tuples into the first clustering cluster set if the k tuples do not meet the $\ell$-Diversity model; including the separated distant tuples into the second tuple set to be allocated;

if the size of the clustering cluster is equal to the parameter k, determining whether the clustering cluster meets the $\ell$-Diversity model; and including the clustering cluster into the second clustering cluster set if the clustering cluster meets the $\ell$-Diversity model, and including the clustering cluster into the first clustering cluster set if the clustering cluster does not meet the $\ell$-Diversity model, where $$f = \frac{g}{k},$$

and g represents the number or the tuples of the subdata sets.

The process of clustering the second subdata sets is the second clustering process of the MSAK anonymity algorithm. The process not only aggregates the tuples of the subdata sets after the outliers are removed, but also clips and determines the clustering clusters and marks the cases that meet the $\ell$-Diversity model.

Preferably, the process of calculating the overall difference of the sensitive attribute values of the clustering cluster includes:

acquiring the sensitive attribute difference matrix;

setting h sensitive attribute values in the cluster, and calculating the sum of the differences among the sensitive attribute values to obtain the overall difference of the sensitive attribute values of the clustering cluster; and normalizing the overall difference of the sensitive attribute values of the clustering cluster.

Preferably, the overall difference of the sensitive attribute values of the clustering cluster is expressed by a formula:

$$d = \sum_{i=1}^{h} \sum_{j=1, j \neq i}^{h} l_i l_j;$$

and the normalizing the overall difference of the sensitive attribute values of the clustering cluster is expressed by a formula $$D = \frac{d}{h(h-1)},$$

where each element in the clustering cluster is required to be compared for h−1 times when the overall difference is calculated, so the $\ell$-Diversity model can be met only by ensuring that $\ell$-1 difference results are 1 in the h−1 times, which is expressed by a formula:

$$D = \frac{d}{h(h-1)};$$

and when the overall difference D reaches $D_{min}$ or more, the overall difference of the sensitive attribute values in the clustering cluster is considered to meet the $\ell$-Diversity model.

Preferably, the tuples in the tuple set to be allocated are allocated to the first clustering cluster set and the second clustering cluster set one by one based on the minimum cluster length binding principle, the difference-meeting binding principle and the minimum information loss principle.

The minimum cluster length binding principle means that when the number of the clustering clusters in the first clustering cluster set is greater than 0, the tuples in the tuple set to be allocated are allocated to the first clustering cluster set to ensure that the tuples can be eliminated from the first clustering cluster set and being included in the second clustering cluster set when the minimum length of each clustering cluster in the first clustering cluster set reaches k and the k-Anonymity model is met.

The difference-meeting binding principle means that the tuples can be eliminated from the first clustering cluster set and be included in the second clustering cluster set when the clustering clusters in the first clustering cluster set are included in the tuple set to be allocated and the $\ell$-Diversity model is met; and it is ensured that all the clustering clusters in the second clustering cluster set finally can meet the $\ell$-Diversity model.

the minimum information loss principle means that the distances between the tuple set to be allocated and the clustering centers of the clustering clusters are compared, the tuples are allocated to the closest cluster, the remaining clustering clusters in the first clustering cluster set are merged nearby until the k-Anonymity model and the $\ell$-Diversity model are met, then the clustering clusters are included in the second clustering cluster set, and otherwise, the clustering clusters are suppressed.

Preferably, all the tuples of the clustering clusters in the second clustering cluster set are replaced with the clustering centers, so that each cluster generates an equivalent class, and each equivalent class is composed of a plurality of same tuples; the size of each equivalent class is the same as that of the corresponding cluster; and the equivalent classes jointly form the anonymized data set.

According to the above technical solution, compared with the prior art, the present invention discloses and provides an anonymity algorithm-based data sharing privacy protection method, including: identifying privacy-related attributes of a structured medical data set; performing semantic standardization and merging on the identified attributes by a MSAK anonymity algorithm, constructing a multi-semantic sensitive attribute classification tree, and calculating a minimum sensitive attribute difference; constructing a virtual initial clustering center, and performing data set clustering and dividing on the identified structured medical data set and the multi-semantic sensitive attribute classification tree to obtain first subdata sets and a sensitive attribute difference matrix; performing outlier detection and separation on the first subdata sets to obtain second subdata sets, and a first tuple set to be allocated and composed of outliers; setting a parameter k of a k-Anonymity model and a parameter $\ell$ of a $\ell$-Diversity model, clustering the second subdata sets, aggregating tuples of the second subdata sets into a clustering cluster, and clipping and determining the clustering cluster according to the size, the parameter k and the parameter (of the clustering cluster to obtain a first clustering cluster set, a second clustering cluster set and a second tuple set to be allocated; determining whether the k-Anonymity model is met according to the number of the tuples in the clustering cluster; according to the sensitive attribute difference matrix, calculating the overall difference of sensitive attribute values of the clustering cluster, and determining whether the overall difference of the sensitive attribute values of the clustering cluster meets the $\ell$-Diversity model; and re-allocating the tuples in the tuple set to be allocated to the first clustering cluster set and the second clustering cluster set one by one, merging and adjusting the remaining clustering clusters in the first clustering cluster set, and performing generalization and suppression to obtain an anonymized data set.

The present invention has the following beneficial effects:
for the characteristics of the medical data having a large data scale and many outliers and including s multi-semantic disease diagnosis attribute, the present invention designs the MSAK anonymity algorithm based on the principle of the clustering algorithm. By aiming to meet the privacy protection requirement and reduce information loss as much as possible on the basis of determining the results of key factors affecting the performance of the anonymity algorithm, the MSAK anonymity algorithm is improved by focusing on the following problems: 1) for the problem of high similarity attack caused by the lack of considering the multi-semantic characteristic of the medical data disease diagnosis attribute by the existing clustering-based anonymity algorithm, the multi-semantic classification tree is constructed, and the minimum difference of the multi-semantic sensitive attributes for the determination of the $\ell$-Diversity model is calculated, so that the similarity attack risk is reduced; 2) for the problem that the clustering-based anonymity algorithm has low execution efficiency in the large-scale data, a data set dividing method for controlling the size of the data set is proposed, so that the subsequent clustering process can realize parallel efficient calculation, and the anonymity processing performance of the algorithm is improved; and 3) for the problem of the poor clustering effect of the clustering-based anonymity algorithm caused by many outliers, the preset invention optimizes the clustering process based on the outlier detection algorithm and adopts a strategy of separation first, then clustering and finally allocation, thereby reducing the information loss in the anonymization process caused by the outliers.

BRIEF DESCRIPTION OF THE DRAWINGS

To describe the technical solutions in the embodiments of the present invention or in the prior art more clearly, the following briefly describes the accompanying drawings required for describing the examples or the prior art. Apparently, the accompanying drawings in the following description are only the embodiments of the present invention, and a person of ordinary skill in the art may still derive other drawings from these accompanying drawings without creative efforts.

FIG. 4 is an example diagram of a sensitive attribute difference matrix according to an embodiment of the present invention;

FIG. 8 is a schematic diagram of data including privacy information before processing according to an embodiment of the present invention;

FIG. 9 is a schematic diagram that processed data privacy information is generalized and used for data analysis according to an embodiment of the present invention.

DETAILED DESCRIPTION OF THE EMBODIMENTS

The technical solutions in the embodiments of the present invention are described clearly and completely with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Compared with other types of anonymity algorithms, a clustering-based anonymity algorithm can anonymize medical data at a cell level, and reduce information loss caused by excessive generalization, thereby retaining more data quality. However, in the existing clustering-based anonymity algorithm, the characteristics of the medical data are not considered. Mainly based on the characteristics of the medical data and by orienting the requirement of medical data sharing privacy protection, the present invention provides a clustering-based anonymity algorithm capable of retaining more data quality on the premise of meeting the same privacy protection model, that is, a MSAK anonymity algorithm.

Figure 10:
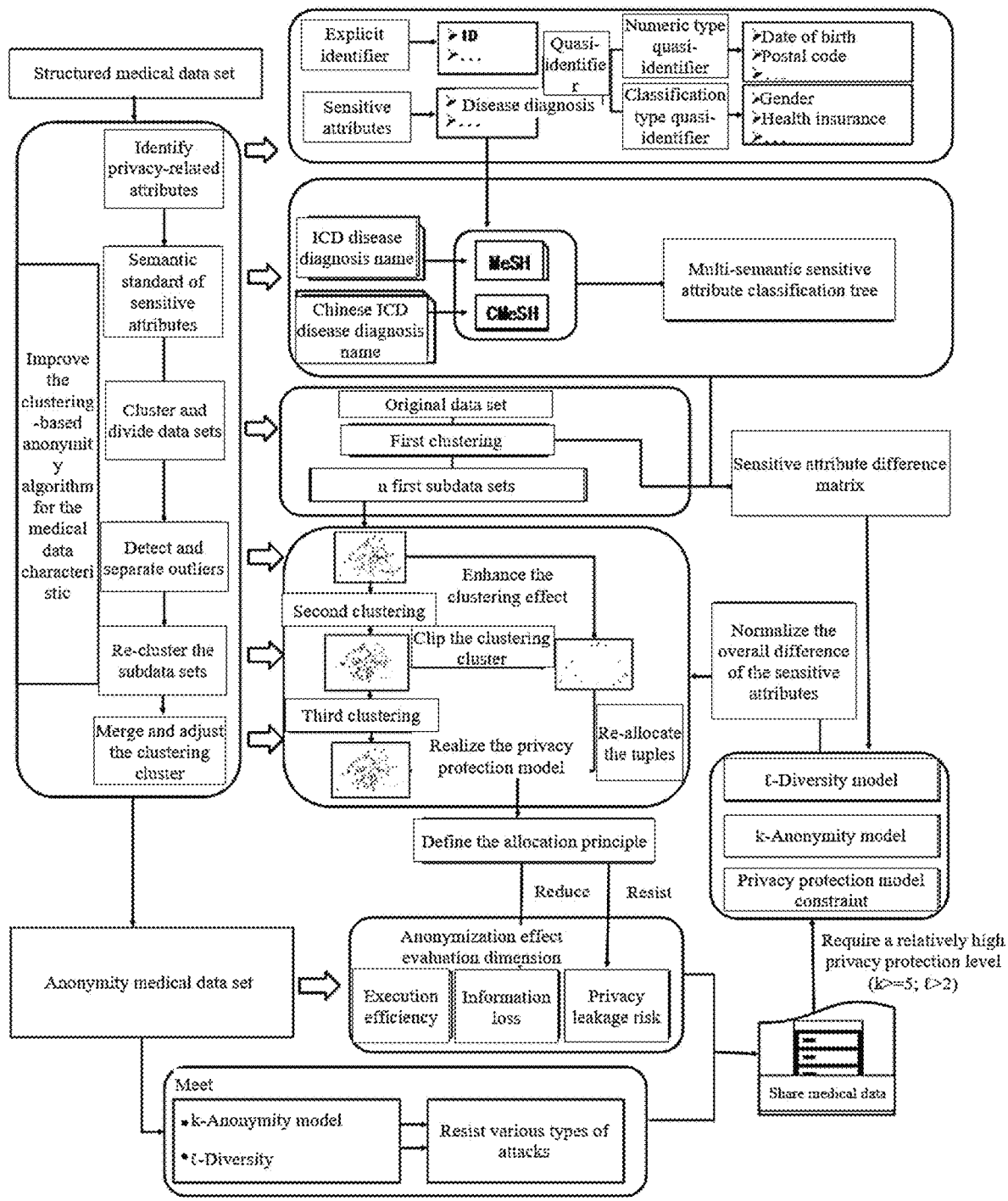
FIG. 10 is an implementation flowchart of a specific algorithm according to an embodiment of the present invention.

Embodiments of the present invention disclose an anonymity algorithm-based data sharing privacy protection method, as shown in FIG. 10, including:

identifying privacy-related attributes of a structured medical data set;

performing semantic standardization and merging on the identified attributes by a MSAK anonymity algorithm, constructing a multi-semantic sensitive attribute classification tree, and calculating a minimum sensitive attribute difference;

constructing a virtual initial clustering center, and performing data set clustering and dividing on the identified structured medical data set and the multi-semantic sensitive attribute classification tree to obtain first subdata sets and a sensitive attribute difference matrix;

performing outlier detection and separation on the first subdata sets to obtain second subdata sets, and a first tuple set to be allocated and composed of outliers;

setting a parameter k of a k-Anonymity model and a parameter $\ell$ of a $\ell$-Diversity model, clustering the second subdata sets, aggregating tuples of the second subdata sets into a clustering cluster, and clipping and determining the clustering cluster according to the size, the parameter k and the parameter $\ell$ of the clustering cluster to obtain a first clustering cluster set, a second clustering cluster set and a second tuple set to be allocated, where the second tuple set to be allocated is updated based on the first tuple set to be allocated;

determining whether the k-Anonymity model is met according to the number of the tuples in the clustering cluster; according to the sensitive attribute difference matrix, calculating the overall difference of sensitive attribute values of the clustering cluster, and determining whether the overall difference of the sensitive attribute values of the clustering cluster meets the $\ell$-Diversity model; and re-allocating the tuples in the tuple set to be allocated to the first clustering cluster set and the second clustering cluster set one by one, merging and adjusting the remaining clustering clusters in the first clustering cluster set, and performing generalization and suppression to obtain an anonymized data set.

In one specific embodiment of the present invention, the first clustering cluster set may be expressed as a set that does not meet the k-Anonymity model and the $\ell$-Diversity model, and the second clustering cluster set may be expressed as a set that meets the k-Anonymity model and the $\ell$-Diversity model.

The generalization includes numeric type attribute generalization and classification type attribute generalization; and the suppression includes explicit identifier suppression and classification type attribute suppression.

In one specific embodiment of the present invention, the MSAK anonymity algorithm is implemented by six processes of identifying privacy related attributes, performing semantic standardization and merging on sensitive attributes, clustering and dividing data sets, detecting and separating outliers, re-clustering subdata sets, and merging and adjusting clustering clusters. Identifying the privacy related attributes and performing semantic standardization and merging on the sensitive attributes are the process of identifying and merging attributes that require privacy protection, which mainly aims to specify the anonymized object, thereby preparing for the subsequent clustering distance measurement and sensitive attribute difference measurement. Clustering and dividing the data sets, detecting and separating the outliers, re-clustering the subdata sets, and merging and adjusting the clustering clusters are the core process of the MSAK anonymity algorithm. The traditional clustering-based anonymity algorithm is improved through outlier separation and three times of clustering. In the core process, the first clustering (the process of clustering and dividing the data sets) of the MSAK anonymity algorithm divides the original data set into a plurality of first subdata sets, and then the outlier of each of the first subdata sets is separated. Then, the remaining tuples (that is, the second subdata sets) of each of the first subdata sets are subjected to the second clustering (the process of re-clustering the subdata sets). The second clustering result generates a plurality of clustering clusters composed of similar tuples, and then it is necessary to clip the distant tuples in the large clusters. Finally, the third clustering (the process of merging and adjusting the clustering clusters) is performed based on all the clustering clusters, that is, after the clustering clusters in all the subdata sets are merged, the outliers and the clipped tuples are re-allocated to the closest clustering cluster. After all the tuples are replaced with the clustering centers, a plurality of equivalent classes that meet the privacy protection model, so that the medical data can be anonymized.

Specifically, the process of identifying the privacy related attributes is as follows: determining all attributes in the structured medical data set that are required to be anonymized, and identifying explicit identifiers, quasi-identifiers and/or sensitive attributes, and then processing the attributes respectively according to these types.

(1) Explicit Identifiers

There are a large number of explicit identifiers in the medical data, including name class, number class and specific contact information class attributes. These explicit identifiers can directly identify the identity of an individual as long as the explicit identifiers are present alone, so in the process of identifying the privacy related attributes, once the attributes are determined as the explicit identifiers, it is necessary to hide all the values of the attributes.

(2) Quasi-Identifiers

The quasi-identifiers are information that can determine the identity of an individual through combination under certain background knowledge, and are key objects processed by the anonymity algorithm. The distance measurement of the quasi-identifiers determines the distance comparison result of the tuples in the clustering process, so it is very important to select a quasi-identifier distance measurement method. According to the data types of the quasi-identifier values, the MSAK anonymity algorithm further divides the quasi-identifiers into a numerical type quasi-identifier and a classification type quasi-identifier. The two types of quasi-identifiers adopt different distance measurement methods.

① Distance Measurement of the Numeric Type Quasi-Identifiers

The distance measurement of the numeric type quasi-identifiers may select a method for calculating Euclidean distance, Manhattan distance or Chebyshev distance. The Euclidean distance is suitable for measuring the distance of continuous variables. The calculation principle of the Euclidean distance is to evaluate the sum of squares of the difference of the numeric type quasi-identifiers and then evaluate the square root of the sum of squares so as to obtain the distance. The formula of calculating the distance between the tuples $(x_{i1}, x_{i2}, \ldots, x_{in})$ and $j=(x_{j1}, x_{j2}, \ldots, x_{j2})$ by the Euclidean distance may be expressed as:

$$d(i, j) = \sqrt{(x_{i1} - x_{j1})^2 + (x_{i2} - x_{j2})^2 + \ldots + (x_{in} - x_{j2})^2}. \quad \text{Formula 1-1}$$

The Manhattan distance is another method for measuring the distance between the tuples of the two numeric type quasi-identifiers and is suitable for measuring the distance of discrete variables. The calculation principle of the Manhattan distance is to use the sum of the absolute values of the differences of the tuples in each dimension as the distance of the quasi-identifiers. The formula of calculating the distance between the tuples $i=(x_{i1}, x_{i2}, \ldots, x_{in})$ and $j=(x_{j1}, x_{j2}, \ldots, x_{j2})$ by the Manhattan distance may be expressed as:

$$d(i, j) = |x_{i1} - x_{j1}| + |x_{i2} - x_{j2}| + \ldots + |x_{in} - x_{jn}|. \quad \text{Formula 1.2}$$

The Chebyshev distance is suitable for measuring the distance of the quasi-identifiers in some extreme cases, which is equal to the maximum value of the differences of the tuples in each dimension. The formula of calculating the distance between the tuples $i=(x_{i1}, x_{i2}, \ldots, x_{in})$ and $j=(x_{j1}, x_{j2}, \ldots, x_{j2})$ by the Chebyshev distance may be expressed as:

$$d(i, j) = \max(|x_{i1} - x_{j1}|, |x_{i2} - x_{j2}|, \ldots, |x_{in} - x_{jn}|). \quad \text{Formula 1.3}$$

② Distance Measurement of Classification Type Quasi-Identifiers

Figure 1:
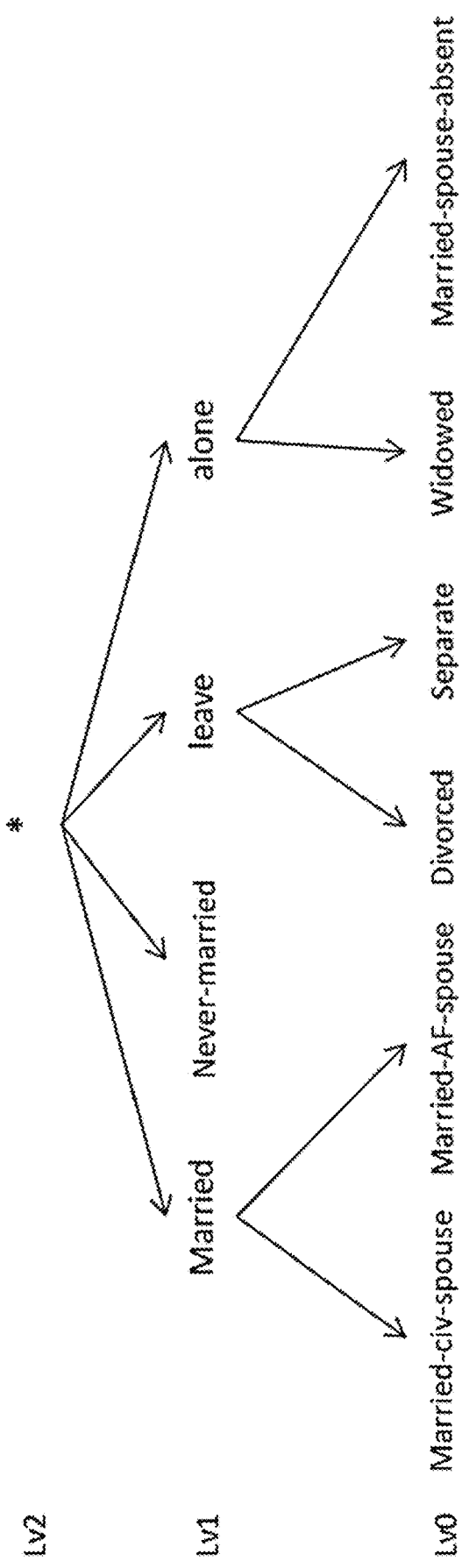
FIG. 1 is a generalization hierarchical structure tree of a classification type quasi-identifier "Marital Status" according to an embodiment of the present invention.

The distance of the classification type quasi-identifiers is measured by means of the corresponding generalization hierarchical structure tree distance. As shown in FIG. 1, FIG. 1 is a generalization hierarchical structure tree of a classification type quasi-identifier "Marital Status" according to an embodiment of the present invention. The quasi-identifier includes seven different values and can be generalized twice at most. Therefore, the generalization hierarchical structure tree of the quasi-identifier "Marital Status" includes two generalization hierarchies and seven leaf nodes (Never-married, Married-civ-spouse, Married-AF-spouse, Divorced, Separate, Widowed, Married-spouse-absent), where the root node is "*". In the generalization hierarchical structure tree, each parent node includes one or a plurality of children nodes. A node without the children node is referred to as a leaf node. Each leaf node represents the value of one classification type quasi-identifier. The distance measurement method for the classification type quasi-identifiers is as follows:

When the distance between the quasi-identifier values "Divorced" and "Separate" is compared, firstly, it is necessary to find a minimum common ancestor of two quasi-identifier values, that is, "leave". At this time, the distance between "Divorced" and "Separate" can be calculated from the longitudinal or transverse dimension. The longitudinal dimension means that the distance is calculated by comparing the ratio of the total height of a subtree and the generalization hierarchical structure tree. The height of the subtree of the minimum common ancestor of "Divorced" and "Separate" is 1, and the total height of the tree is 2, so the distance of the longitudinal dimension is ½. The transverse dimension is to calculate the distance by comparing the ratio of the number of the leaf nodes of the subtree and the generalization hierarchical structure tree. The number of the leaf nodes of the minimum common ancestor of "Divorced" and "Separate" is 2, and the total number of the leaf nodes of the tree is 7, so the distance of the transverse dimension is 2/7. It can be seen that the transverse dimension distance is more correlated to the number of the leaf nodes, and the longitudinal dimension distance is more correlated with the height of the generalization hierarchical structure tree. Therefore, when there are many values of the quasi-identifiers, the MSAK anonymity algorithm measures the distance of the classification type quasi-identifiers by using the transverse dimension distance; and when the generalization hierarchical structure tree of the classification type quasi-identifiers is relatively high, the MSAK anonymity algorithm measures the distance of the classification type quasi-identifiers by using the longitudinal dimension distance.

(3) Sensitive Attributes

A disease diagnosis attribute is the most common sensitive attribute in medical data. The disease diagnosis attribute belongs to a multi-semantic classification attribute, so when the ℓ-Diversity model is determined during anonymization, it is necessary to consider all the classification situations of the disease diagnosis, thereby avoiding the underestimation of the similarity between different disease diagnoses, and reducing the similarity attack risk. The MSAK anonymity algorithm constructs a multi-semantic classification tree for the disease diagnosis attribute through the process of performing semantic standardization and merging on the sensitive attributes, and also lays the foundation for the subsequent multi-semantic sensitive attribute difference calculation.

Specifically, the process of performing semantic standardization and merging on the sensitive attributes is: the values of the sensitive attributes have many manifestations, for example, an ICD code, a diagnosis name, a diagnosis code and the binary value of the disease belong to the disease diagnosis attributes. To calculate the similarity of different forms of disease diagnoses, the MSAK anonymity algorithm performs semantic standardization and merging on all the related attributes, and maps all the attribute values to entities of medical subject headings (MeSH) or Chinese medical subject headings (CMeSH). Then, a corresponding multi-semantic classification tree is constructed based on a tree code of each MeSH or CMeSH disease entity, and the minimum difference of the disease diagnosis value attributes is calculated by using the multi-semantic classification tree.

Using MeSH or CMeSH as the object on which the disease diagnosis attribute semantic standardization and merging is performed has two advantages. 1. Each entity in MeSH and CMeSH has a plurality of entry terms, so that the mapping accuracy of the disease diagnosis attributes can be improved; and 2. MeSH and CMeSH are widely used multi-semantic classification systems, and the classification authority thereof ensures that the subsequent minimum difference result based on the multi-semantic classification tree has reliability.

(1) The multi-semantic sensitive attribute classification tree is constructed for resisting the similarity attack. As bute value, so that the minimum difference of the sensitive attributes is further calculated.

(2) The minimum difference of the sensitive attributes is calculated based on the multi-semantic classification tree: each multi-semantic sensitive attribute classification tree has a plurality of tree paths, and calculating the minimum difference of two different multi-semantic sensitive attributes is equivalent to finding two tree paths with the shortest distance between two attribute values. Taking the case where the minimum difference of chronic obstructive pulmoriary disease (COPD) and chronic kidney failure (CKF) is calculated based on the multi-semantic classification tree as an example, the specific calculation process is as follows:

COPD has two subject term tree paths in MeSH, so there are two tree codes, which are respectively C08.381.495.389 and C23.550.291.500.875; CKF has four subject term tree paths in MeSH, so there are fourth tree codes, which are respectively C12.200.777.419.780.750.500, C12.950.419.780.750.500, C23.550.291.500.906.500 and C12.050.351.968.419.780.750.500. By comparing the sequence traversal of each tree code of two entities from top to bottom in pairs, it can be concluded that the tree code C23.550.291.500.875 of COPD is closest to the tree code C23.550.291.500.906.500 of CKF. The maximum depth of the two tree codes is 5, and the depth of the subtree constructed by the two entities and the minimum common parent class is 2. Then, at this time, the distance $2/5$ between the two can be obtained through calculation by referring to the longitudinal dimension distance measurement method of the classification type quasi-identifiers, that is, the minimum difference between COPD and CKF is $2/5$.

Specifically, by the first clustering, the data scale can be reduced and the execution efficiency can be improved; and the data set clustering and dividing process is as follows: the data set clustering and dividing process divides the original data set into n first subdata sets with similar sizes through the first clustering, and the pseudocode of the data set clustering and dividing process is shown in Table 1-1.

TABLE 1-1

Figure 2:
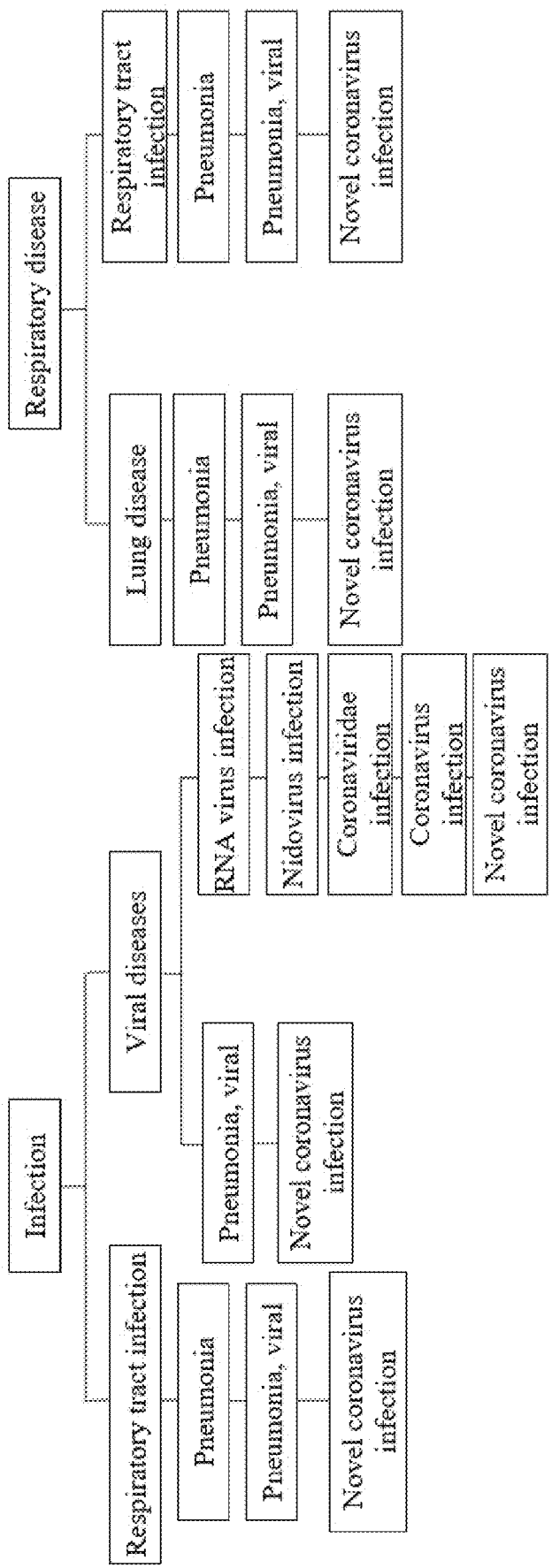
FIG. 2 is a "novel coronavirus infection" multi-semantic classification tree example diagram according to an embodiment of the present invention.

Input: the data set S composed of m quasi-identifiers $\{R_1,R_2,...,R_m\}$, the data set dividing parameter n, and the sensitive attribute multi-semantic classification tree
Output: n first subdata sets $\{S_1,S_2,...,S_n\}$, and the sensitive attribute difference matrix 1. for each quasi-identifier $R_i \in \{R_1,R_2,...,R_m\}$:
2. count the occurrence frequency of each value
3. arrange the occurrence frequency of the attribute values in ascending order
4. select n values at equal intervals, and combine each quasi-identifier to construct n virtual initial clustering centers
5. for each tuple $s_i \in S$:
6. compare the distances between the tuple $s_i$ and all the clustering centers
7. merge the tuples into the closest clustering clusters and update the clustering center of the clustering cluster
8. record non-repetitive sensitive attributes, calculate the difference between the sensitive attribute values in pairs, and construct a difference matrix
9. return $\{S_1,S_2,...,S_n\}$, and the sensitive attribute difference matrix shown in FIG. 2, FIG. 2 is an example diagram of a multi-semantic classification tree constructed by CMeSH when the diagnosis value is "novel coronavirus infection". It can be seen from FIG. 2 that "novel coronavirus infection" has five semantic classification cases, so in the five subject term tree paths of the multi-semantic classification tree, the depths of the tree paths are different, the maximum is 6 and the minimum is 3. The overall sensitive attribute multi-semantic classification tree can be obtained by integrating the multi-semantic classification tree of each sensitive attribute It can be seen from Table 1-1 that the input of the process includes the structured medical data set, the number n of the first subdata sets that are required to be divided and the sensitive attribute multi-semantic classification tree constructed in the semantic standardization and merging process of the sensitive attributes, and n first subdata sets and the sensitive attribute difference matrix are output after each step of the algorithm. The structured medical data set is shown in Table 1.

TABLE 1

| ID | Gender | Date of Birth | Postal Code | Health Insurance Type | Disease Diagnosis |
|---|---|---|---|---|---|
| 1 | Female | Nov. 12, 1980 | 100010 | Basic medical insurance system for urban workers | Novel coronavirus infection |
| 2 | Female | Nov. 3, 1980 | 100010 | Basic medical insurance system for urban workers | Novel coronavirus infection |
| 3 | Male | Nov. 1, 1980 | 100020 | New rural co-operative medical system | Pulmonary abscess |
| 4 | Female | Nov. 30, 1980 | 100010 | Basic medical insurance system for urban residents | Pulmonary abscess |
| 5 | Male | Nov. 11, 1980 | 100020 | New rural co-operative medical system ... | Pleurisy |

Figure 3:
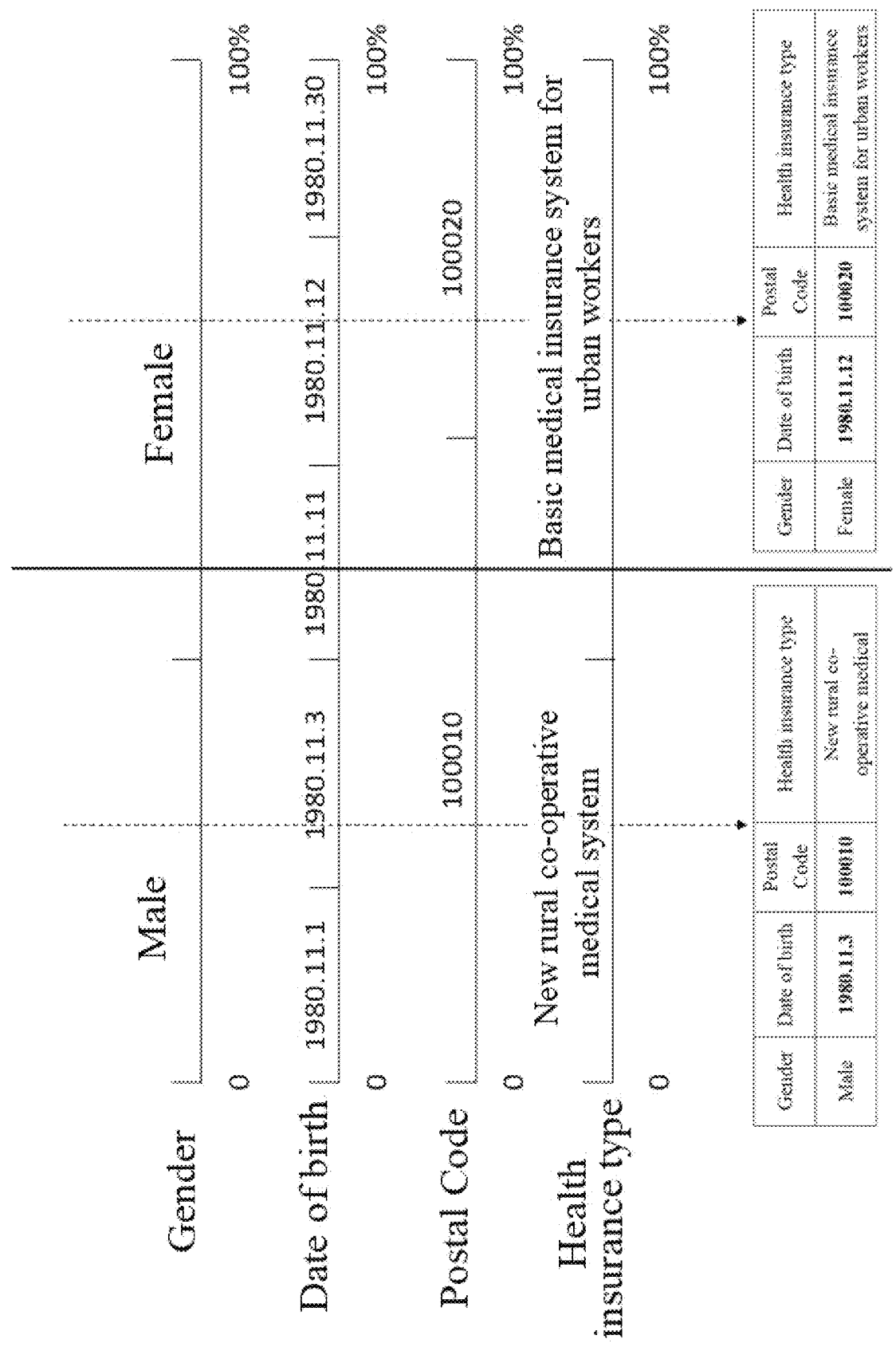
FIG. 3 is an example diagram of a process of constructing a virtual initial clustering center according to an embodiment of the present invention.

The objective of the steps 1-4 of the data set clustering and dividing process is to construct the virtual initial clustering centers and improve the similarity of the tuples in the first subdata sets generated by clustering. This is an improvement on the problems that the traditional clustering-based anonymity algorithm is greatly affected by the initial clustering centers and the random selection of the clustering centers will lead to the unstable dividing effect of the first subdata sets. The process of constructing the virtual initial clustering centers is shown in FIG. 3, and the specific description of the process is as follows:

firstly, the frequency of each value of each quasi-identifier of the structured medical data set is counted; and then the numeric type quasi-identifiers (date of birth and postal code) are arranged according to the numeric values in ascending order, and the classification type quasi-identifiers (gender and health insurance type) are arranged according to the occurrence frequency of each attribute value in a ratio ascending order. Then, each sequence is correspondingly and equally divided (as shown in FIG. 3, FIG. 3 is an example during halving) according to the number of the first subdata sets that are required to be divided, and then the value of each sequence corresponding to the midline of each part is the virtual initial clustering center.

The steps 5-7 of the data set clustering and dividing process indicate that after the virtual initial clustering centers are constructed, the distances between all the tuples and these clustering centers one by one are compared, and each tuple is included in the closest clustering cluster. The clustering center of the clustering cluster is updated every time the tuples are included, the distance is weighted by the size of the clustering cluster, and the sizes of the first subdata sets are controlled, thereby ensuring that the finally generated n first subdata sets are similar in size.

The above process traverses each tuple, so all non-repetitive sensitive attribute values in the structured medical data set can be recorded in the step 8. Then, in combination with the sensitive attribute multi-semantic classification tree constructed in the semantic standardization and merging process of the sensitive attributes, the sensitive attribute difference can be calculated and be used to determine the C-Diversity model in the subsequent process. As shown in FIG. 4 which is an example diagram of the sensitive attribute difference matrix, each value in the matrix is the minimum difference corresponding to two diseases.

Specifically, the outlier detection and separation process is: the outlier detection and separation process is performed in all the first subdata sets generated in the data clustering and dividing process. The outliers can be separated by an isolation forest algorithm, a local outlier factor (LOF) algorithm or other algorithms capable of performing outlier detection. The isolation forest algorithm has low time complexity and can reduce the influence of the outlier detection and separation process on the execution efficiency of the anonymity algorithm, so the MSAK anonymity algorithm detects and separates the outliers of these first subdata sets by the isolation forest algorithm. The pseudocode of the outlier detection and separation process is shown in Table 1-2.

TABLE 1-2

Input: n first subdata sets $\{S_1,S_2,...,S_n\}$, and the outlier ratio parameter o
Output: n second subdata sets with outliers removed $\{S'_1,S'_2,...,S'_n\}$, and the first tuple set to be allocated 1. for each of the first subdata sets $S_i \in \{S_1,S_2,...,S_n\}$:
2. convert classification attribute values of the first subdata sets into dummy variable values according to the generalization hierarchical structure
3. fit data by the isolation forest algorithm of a scikit-learn module, and set the outlier ratio to o
4. generate outlier sets $\{O_1,O_2,...,O_n\}$ and include the outlier sets into the first tuple set to be allocated
5. remove the outliers $\{O_1,O_2,...,O_n\}$ from the first subdata set $S_i$
6. return $\{S'_1,S'_2,...,S'_n\}$, and the first tuple set to be allocated It can be seen from Table 1-2 that the input of the process includes all the first subdata sets and the outlier ratio parameter o, and the second subdata sets with the outliers separated and the first tuple set to be allocated and composed of the outliers are output after each step of the algorithm.

Figure 5:
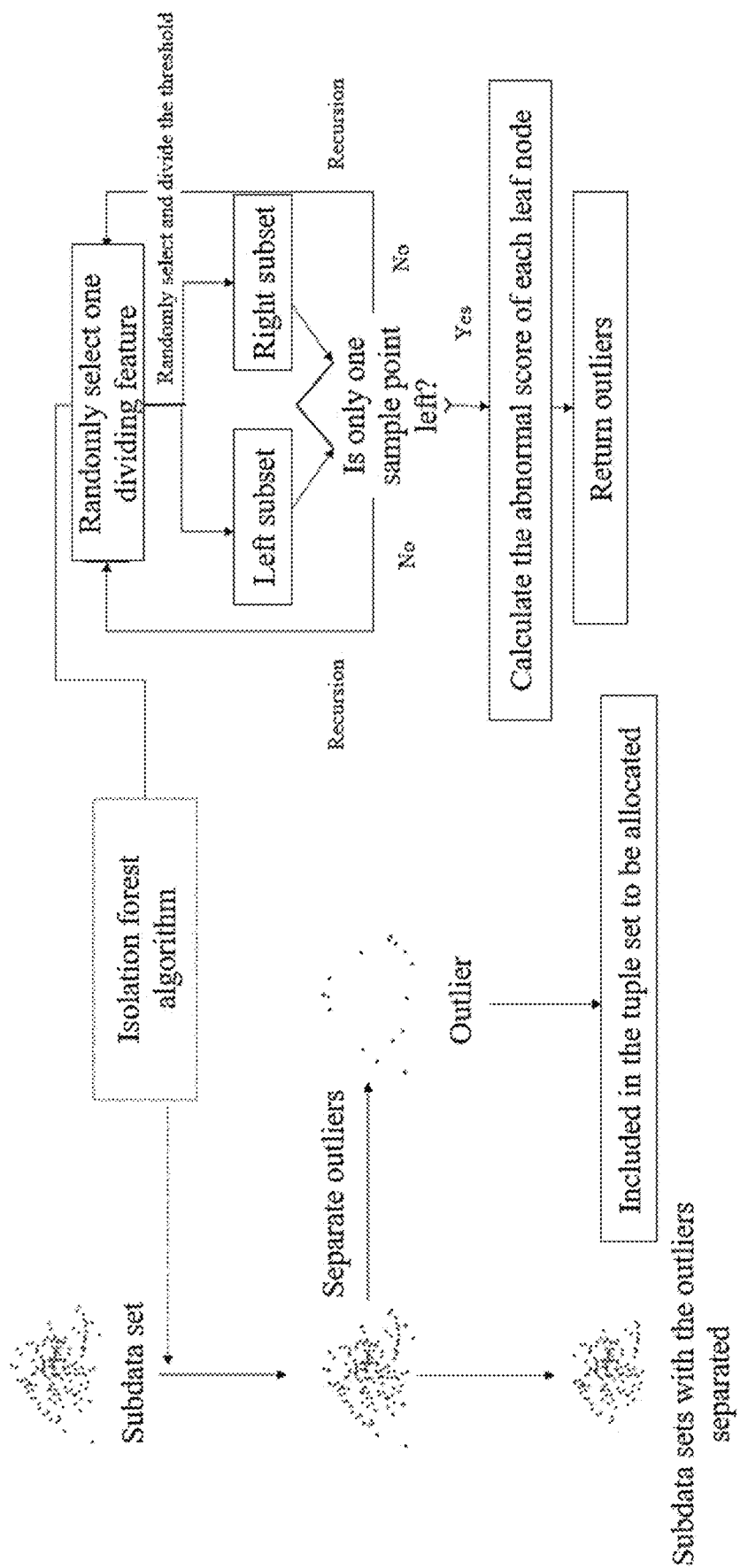
FIG. 5 is a schematic diagram of a process of detecting and separating an outlier by an isolation forest algorithm according to an embodiment of the present invention.

The step 1 in the outlier detection and separation process indicates that the algorithm process is performed in each of the first subdata sets independently without interference. Therefore, the process can improve the execution efficiency of the algorithm by performing parallel processing on each of the first subdata sets. The steps 2-5 are the process of detecting and separating the outliers by the isolation forest algorithm, and the specific process is shown in FIG. 5. As an algorithm commonly used to detect the outliers, the isolation forest algorithm has mature libraries or frameworks available in many programming languages, for example, scikit-learn of Python, PyOD, Weka of Java, isolationForest of R, Isolation Forest Toolbox of MATLAB, and the like. The specific principle of the isolation forest algorithm is described as follows:

firstly, one feature of the data set is selected randomly, and one segmentation threshold is selected randomly between the maximum and the minimum of the feature. Then, each tuple is divided into two subsets (left subset and right subset) according to the value thereof on the feature, each subset is taken as one new node, and the above process is repeated in the subsets until each subset has only one sample point left, that is, only includes one tuple. This process can form one binary tree, where a root node represents the whole data set, and a left node represents a single tuple. The isolation forest algorithm constructs a plurality of random binary trees by repeating the above steps. For each tuple, the algorithm can calculate the average isolated depth of the tuple. Abnormal values are more easily separated in the data sets, so the abnormal values usually require less depth than normal values to be isolated. Therefore, data points with the relatively small average isolated depth can be considered as the abnormal values.

It should be noted that the determination of the outlier ratio parameter is an important factor affecting the detection and separation results of the outliers. Some literatures mentioned that the outlier ratio of the data sets is usually between 1% and 10%, but in some cases, especially in some high-dimensional data sets, the outlier ratio will be higher than 10%. In the whole process of the MSAK anonymity algorithm, the objective of detecting and separating the outliers is to reduce the influence on the clustering result by the outliers, and the existence of the outliers will lead to excessive generalization of the whole clustering cluster, so the overall clustering effect will be better when the outlier ratio parameter is set to a relatively high value. Meanwhile, it is necessary to determine the outlier ratio parameter in combination with the characteristic of the quasi-identifiers of the medical data set. When there are many quasi-identi-fiers with large heterogeneity in the medical data set, the outlier ratio parameter can be increased appropriately. When there are many time type quasi-identifiers with small heterogeneity in the medical data set, the outlier ratio parameter can be reduced appropriately.

Specifically, the process of re-clustering the subdata sets is: the process of re-clustering the subdata sets is the second clustering process of the MSAK anonymity algorithm. The process not only aggregates the tuples of the second subdata sets after the outliers are removed, but also clips and determines the clustering clusters and marks the cases that meet the $\ell$-Diversity model. The pseudocode of the process of re-clustering the subdata sets is shown in Table 1-3:

TABLE 1-3

| Input: the second subdata sets $\{S'_1, S'_2, ..., S'_n\}$ after the outliers are separated, the first tuple set to be allocated, and the parameter k and the parameter l of the privacy protection model<br>Output: the first clustering cluster set $S''_1$, the second clustering cluster set $S''_2$ and the second tuple set to be allocated |
|---|
| 1. for each of the second subdata sets $S'_i \in \{S'_1, S'_2, ..., S'_n\}$:<br>2. select f tuples randomly from the second subdata set $S'_i$ as clustering centers<br>3. for each remaining tuple $s_i \in S'_i$:<br>4. compare the distances between the tuple $s_i$ and all the clustering centers<br>5. merge the tuples into the closest clustering clusters and update the clustering center of the clustering cluster<br>6. for each clustering cluster $C_j \in S'_i$<br>7. if the size of the clustering cluster is less than k:<br>8. include the clustering cluster $C_j$ into the first clustering cluster set $S''_1$<br>9. else:<br>10. if the size of the clustering cluster is greater than k:<br>11. eliminate the excessively distant tuples and include the tuples into the first tuple set to be allocated, and only retain k tuples<br>12. if the clustering cluster meets the l-Diversity model<br>13. include the clustering cluster Cj into the second clustering cluster set $S''_2$<br>14. else:<br>15. include the clustering cluster $C_j$ into the first clustering cluster set $S''_1$<br>16. return the first clustering cluster set $S''_1$, the second clustering cluster set $S''_2$ and the second tuple set to be allocated |

It can be seen from Table 1-3 that the input of the process includes all the second subdata sets with the outliers separated, the first tuple set to be allocated, the parameter k of the k-Anonymity model and the parameter $\ell$ of the $\ell$-Diversity model, and the first clustering cluster set S" 1, the second clustering cluster set S"2 and the second tuple set to be allocated are output after each step of the algorithm, where $$f = \frac{g}{k},$$

and g represents the number or the tuples of the subdata sets.

Similar to the outlier detection and separation process, the step 1 of the subdata set re-clustering process also indicates that the algorithm process is performed in each second subdata set independently without interference, and the execution efficiency of the algorithm can be improved through a parallel calculation method. The step 2 indicates that $$\frac{\text{the number of the tuples of the subdata sets}}{k}$$

(rounding down) tuples are randomly selected from the second subdata sets to serve as clustering centers, and then in the steps 3-5, the remaining tuples are allocated to the closest clustering cluster in the same second subdata set one by one, and the clustering centers are updated at each allocation. After all the tuples are allocated, each second subdata set generates $$\frac{\text{the number of the tuples of the subdata sets}}{k}$$

(rounding down) clustering clusters with different sizes.

Figure 6:
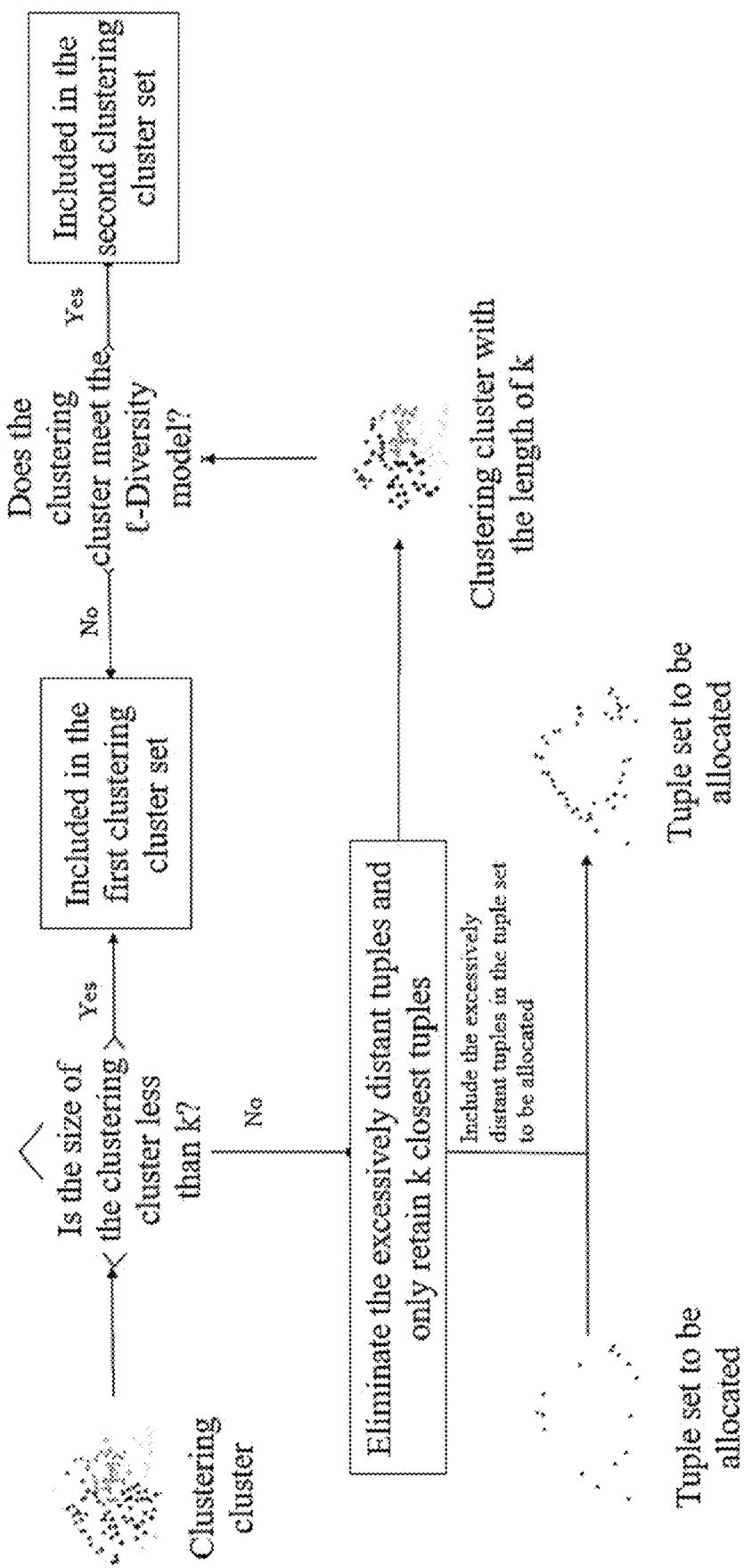
FIG. 6 is a processing flowchart of a cluster after second clustering according to an embodiment of the present invention.

The steps 6-15 are the subsequent process of clipping the clustering clusters and determining the ℓ-Diversity model, and the specific process is shown in FIG. 6. In this process, the size of each clustering cluster is determined first; if the size of the clustering cluster is less than k, the clustering cluster is included in the first clustering cluster set; if the size of the clustering cluster is greater than k, k tuples are retained, the distant tuples are separated, and whether the remaining tuples meet the ℓ-Diversity model is determined; if the remaining tuples meet the ℓ-Diversity model, the clustering clusters with the excessively distant tuples eliminated are included in the second clustering cluster set, otherwise, the clustering clusters with the excessively distant tuples eliminated are included in the second tuple set to be allocated; if the size of the clustering cluster is equal to k, whether the clustering cluster meets the ℓ-Diversity model is directly determined; and if the clustering cluster meets the ℓ-Diversity model, the clustering cluster is included in the second clustering cluster set, otherwise, the clustering cluster is included in the first clustering cluster set.

The MSAK anonymity algorithm considers the multi-semantic characteristic of the sensitive attributes in the medical data set when determining whether the clustering cluster meets the ℓ-Diversity model. Therefore, unlike the traditional clustering-based anonymity algorithm which only simply calculates whether the number of different sensitive attribute values in the clustering cluster reaches a threshold, it is necessary to determine the sum of the differences between the sensitive attribute values reaches a threshold ℓ. The pseudocode of the sensitive attribute difference determining process is shown in Table 1-4:

TABLE 1-4

Input: h sensitive attribute values $\{l_1, l_2, \ldots, l_h\}$ of the clustering cluster $C_j$, the sensitive attribute difference matrix and the privacy protection model parameter ℓ
Output: Boolean value 1. read the sensitive attribute difference matrix constructed in the data set dividing process
2. calculate the overall difference of the sensitive attribute values in the clustering cluster $C_j$ to be $D = \dfrac{\sum_{i=1}^{h} \sum_{j=1, j\neq i}^{h} l_i l_j}{h(h-1)}$ 3. if $D \geq \dfrac{\ell - 1}{h - 1}$:

4. return True
5. else:
6. return False

In the determining process, each sensitive attribute value of the clustering clusters, the sensitive attribute difference matrix and the parameter ℓ of the ℓ-Diversity model are input, and the determination result Boolean value is output after each step of the algorithm. Step 1: the sensitive attribute difference matrix constructed in the data set clustering and dividing process is read, and the repetitive calculation of the sensitive attribute difference is reduced. Step 2: the overall difference of all the sensitive attributes of the whole clustering cluster is calculated, and the calculate process is as follows:

assuming that there are totally h sensitive attribute values in the clustering cluster, namely l1, l2, . . . , lh, the overall sensitive attribute difference of the clustering cluster is equal to the sum of the differences between the sensitive attribute values, which is expressed by the formula:

$$d = \sum_{i=1}^{h} \sum_{j=1, j\neq i}^{h} l_i l_j. \qquad \text{Formula 1.4}$$

To make the clustering clusters with different sizes be capable of being subjected to ℓ-Diversity determination with the same standard, it is also necessary to normalize the result. There are h elements in the clustering clusters, and each element is required to be compared for h−1 times when the overall difference is calculated. Therefore, the comparison times of the sensitive attribute differences are h*(h−1), and the normalization formula of the overall difference of the clustering clusters is:

$$D = \frac{d}{h(h-1)}. \qquad \text{Formula 1.5}$$

The steps 3-6 of the determination process is the process of determining whether the overall sensitive attribute difference of the clustering clusters meet the threshold of the ℓ-Diversity model. Each element in the clustering clusters is required to be compared for h−1 times when the overall difference is calculated. Therefore, the ℓ-Diversity model can be met only by ensuring that ℓ-1 difference results are 1 in the h−1 times, which is expressed by the formula:

$$D_{min} = \frac{h(l-1)}{h(h-1)} = \frac{\ell - 1}{h - 1}. \qquad \text{Formula 1.6}$$

The greater the overall sensitive attribute difference of the clustering clusters, the stronger the ability of resisting the similarity attract. Therefore, when the overall difference D reaches or more, the difference of the sensitive attribute values in the clustering cluster, can be considered to meet the ℓ-Diversity model.

Specifically, the clustering cluster merging and adjusting process: the clustering cluster merging and adjusting process is a process of allocating the second tuples to be allocated to each clustering cluster, and then replacing all the tuples in the clustering clusters with the clustering centers to realize anonymization. The pseudocode of the clustering cluster merging and adjusting process is shown in Table 1-5:

TABLE 1-5

Input: the first clustering cluster set S"$_1$, the second clustering cluster set S"$_2$, the second tuple set to be allocated, and the parameter k and the parameter l of the privacy protection model
Output: the anonymity medical data set 1. for each tuple $s_i \in$ the second tuple set to be allocated:
2. if the size of the first clustering cluster set S"$_1$ is greater than 0:
3. the distance between the tuple $s_i$ and each clustering center in the first clustering cluster set S"$_1$ is compared, and the closest clustering cluster is $C_{close}$
4. if the l-Diversity model is met after the tuple $s_i$ is included in the clustering cluster $C_{close}$:
5. the tuple $s_i$ is included in the clustering cluster $C_{close}$ and the clustering center is updated
6. if the size of $C_{close}$ is greater than or equal to k after the tuple is included:
7. the clustering cluster $C_{close}$ is excluded from the first clustering cluster S"$_1$ and included in the second clustering cluster set S"$_2$
8. else:
9. the distance between the tuple $s_i$ and the clustering center of each cluster in the second clustering cluster set S"$_2$ is compared, and the tuple is included in the closest clustering cluster
10. else:
11. the distance between the tuple $s_i$ and the clustering center of each cluster in the second clustering cluster set S"$_2$, and the tuple is included in the closest clustering cluster
12. the first clustering cluster set S"$_1$ is merged and adjusted, and all the tuples in the second clustering cluster set S"$_2$ are replaced with the clustering centers to form an anonymity medical data set
13. return the anonymity medical data set It can be seen from Table 1-5 that the input of the process includes the first clustering cluster set S"1, the second clustering cluster set S"2, the second tuple set to be allocated, the parameter k of the k-Anonymity model and the parameter ℓ of the ℓ-Diversity model, and the anonymity medical data set is output after each step of the algorithm, as shown in Table 2.

TABLE 2

| ID | Gender | Date of birth | Postal Code | Health Insurance Type | Disease Diagnosis |
|---|---|---|---|---|---|
| * | * | 1980.11 | 100010, 100020 | Social medical insurance | COVID-19 |
| * | * | 1980.11 | 100010, 100020 | Social medical insurance | COVID-19 |
| * | * | 1980.11 | 100010, 100020 | Social medical insurance | Pulmonary abscess |
| * | * | 1980.11 | 100010, 100020 | Social medical insurance | Pulmonary abscess |
| * | * | 1980.11 | 100010, 100020 | Social medical insurance | Pleurisy |
| ... | | | | | |

Figure 7:
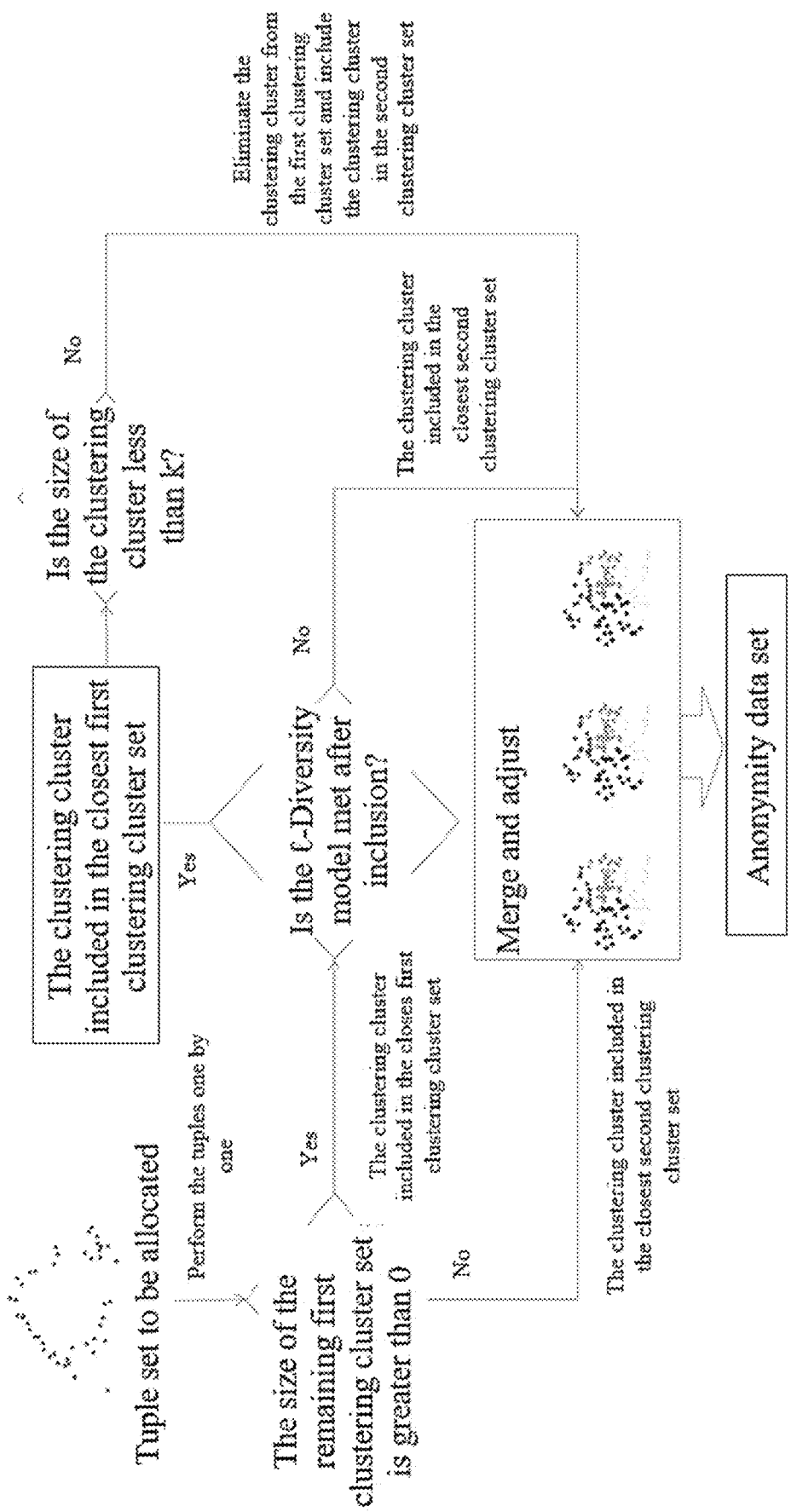
FIG. 7 is an allocation flowchart of a tuple to be allocated according to an embodiment of the present invention.

The steps 1-11 of the clustering cluster merging and adjusting process is an allocation process of allocating the second tuples to be allocated to all the clustering clusters in the first clustering cluster S"1 and the second clustering cluster set S"2 one by one, that is, the third clustering process of the MSAK anonymity algorithm. The specific process is shown in FIG. 7. The allocation process can define three allocation principles, namely the minimum cluster length binding-based principle, the difference-meeting binding-based principle and the minimum information loss-based principle The minimum cluster length binding-based principle means that when the first clustering cluster set S"1 is greater than 0, the tuples to be allocated is preferentially allocated to the first clustering cluster set to ensure that the minimum cluster length of each clustering cluster can reach k, thereby meeting the requirement of the k-Anonymity model. The difference-meeting binding-based principle means that the clustering clusters in the first clustering cluster set can be eliminated from the first clustering cluster set and included in the second clustering cluster set only when the ℓ-Diversity model is met after the clustering clusters in the first clustering cluster set are included in the tuple set to be allocated, thereby ensuring that all the clustering clusters can meet the ℓ-Diversity model. The minimum information loss-based principle means that the tuples to be allocated are only allocated to the closest clustering clusters, and the remaining clustering clusters in the first clustering cluster set are merged nearby until meeting the k-Anonymity model and the ℓ-Diversity model, then the clustering clusters are included in the second clustering cluster set, and finally, the clustering clusters not meeting the models are suppressed, thereby reducing the information loss as much as possible.

In the step 12 in the clustering cluster merging and adjusting process, the first clustering cluster set S"1 is merged and adjusted, and all the tuples in the second clustering cluster S"2 are replaced with the clustering centers, so that each clustering cluster respectively generates an equivalent class, each equivalent class is composed of a plurality of same tuples, the size is equal to that of the corresponding clusters, and all the equivalent classes jointly form the anonymity medical data set.

In one specific embodiment of the present invention, as shown in FIG. 10, the anonymity medical data set meets the k-Anonymity model and the ℓ-Diversity model and can resist various types of attacks, including a link attack, a homogeneity attack, a skew attack and a similarity attack. The anonymity effect is evaluated from three dimensions such as execution efficiency, information loss and privacy leakage. The execution efficiency can be evaluated through the algorithm operation time. The information loss can be evaluated through suppression rate, standardized deterministic punishment, information loss rate and/or disequilibrium entropy. The privacy leakage risk can be evaluated through the link attack risk, the homogeneity attack risk, the skew attack risk and/or the similarity attack risk. For balancing the data available and privacy, so that the data is taken as shared medical data. If a higher privacy protection level is required, k may be set to be greater than or equal to 5, and $\ell$ may be set to be greater than or equal to 2.

According to the present invention, the effect of anonymizing the medical data set by the MSAK anonymity algorithm can be evaluated from three dimensions such as the algorithm execution efficiency, the information loss and the privacy disclosure risk. The anonymization result balances the data safety and availability, which can meet the requirements of data sharers and privacy-related policies and the need of research users and realize the privacy sharing protection of medical data. As shown in FIG. 8, it is a schematic diagram of data including privacy information before processing according to an embodiment of the present invention. As shown in FIG. 9, it is a schematic diagram that processed data privacy information is generalized and used for data analysis according to an embodiment of the present invention.

Another specific embodiment of the present invention provides three representative clustering-based anonymity algorithms (KNN algorithm, k-member algorithm and OKA algorithm) and a global generalization algorithm (FLASH algorithm) with the leading performance at present.

(1) KNN Algorithm

The core of the KNN algorithm is to randomly select the clustering centers and then sequentially select the nearest k−1 tuples to be aggregated into clusters. Therefore, the $\ell$-Diversity model with l=2 can be realized only by ensuring that the sensitive attribute values of k tuples generated at each time are not exactly the same. The specific implementation method is as follows: selecting the nearest k−2 tuples first to be aggregated into clusters, determining whether the $\ell$-Diversity can be met when the (k−1)th element is included, performing including if the $\ell$-Diversity can be met, and determining the next nearest element if the $\ell$-Diversity cannot be met until the condition can be met, and including the tuples meeting the condition to form clustering clusters.

(2) k-Member Algorithm

The biggest difference between the k-member algorithm and the KNN algorithm is that the k-member algorithm selects the adjacent tuples one by one and it is necessary to continuously update the clustering centers. Therefore, the similar idea can be used to determine whether the $\ell$-Diversity model can be met after the (k−1)th tuple is included, the tuple is included if the $\ell$-Diversity model can be met, the next nearest element is determined if the $\ell$-Diversity model cannot be met until the condition can be met, and the tuples meeting the condition is included to form the clustering cluster.

(3) OKA

OKA includes two stages such as a clustering stage and an adjusting stage. In the adjusting stage, it is necessary to compare the distance between the redundant tuples and each clustering cluster one by one. Therefore, it is only necessary to mark the clustering clusters that do not meet the $\ell$-Diversity model in the clustering stage, and when the redundant tuples are allocated one by one in the adjusting stage, the tuples of the $\ell$-Diversity model can be preferentially allocated to the clustering clusters that do not meet the $\ell$-Diversity model, thereby protecting the $\ell$-Diversity mode of l=2.

The embodiment of the present invention selects three representative clustering-based algorithms (KNN algorithm, k-member algorithm and OKA algorithm) and a global generalization algorithm (FLASH algorithm) as comparison algorithms, and a simulation experiment data set is constructed by using an adult data set and a disease diagnosis field of MIMIC-IV to verify the simulation experiment. The execution efficiency, information loss and privacy disclosure risk of the anonymization results of the MSAK anonymity algorithm and other algorithms are compared under the same experiment condition. The result indicates that under the relatively high privacy protection level, when large-scale medical data is anonymized, the execution effect of the MSAK anonymity algorithm is higher than that of other clustering-based anonymity algorithms, the suppression rate and the overall information loss performance are better than all other algorithms; furthermore, the link attack risk and the similarity attack risk can be significantly reduced, and the data safety and availability can be balanced better.

According to the present invention, an attribute that requires privacy protection is identified and merged, and an anonymity processing object is specified; first clustering is performed by a MSAK anonymity algorithm to divide an original data set into a plurality of first subdata sets, and an outlier of each of the first subdata sets is separated to form second subdata sets and a first tuple set to be allocated; second clustering is performed on each of the second subdata sets to generate a plurality of clustering clusters including similar tuples, and the sizes of the clustering clusters are determined and distant tuples are clipped to form a first clustering cluster set, a second clustering cluster set and a second tuple set to be allocated; and third clustering is performed based on all the clustering clusters, all tuples to be allocated are allocated to the first clustering cluster set and the second clustering cluster set, and all the tuples in the clustering clusters are replaced with clustering centers to generate an equivalent class meeting a privacy protection model, thereby realizing the anonymity of data.

Each embodiment of the specification is described in a progressive manner, each embodiment focuses on the difference from other embodiments, and the same and similar parts between the embodiments may refer to each other. For a device disclosed in the embodiments, since the device corresponds to the method disclosed in the embodiments, the description is relatively simple, and reference can be made to the method description.

The above description of the disclosed embodiments enables a person skilled in the art to implement or use the present invention. Various modifications to these embodiments are readily apparent to a person skilled in the art, and the generic principles defined herein may be practiced in other embodiments without departing from the spirit or scope of the invention. Thus, the present invention is not limited to the embodiments shown herein, but falls within the widest scope consistent with the principles and novel features disclosed herein.

The invention claimed is:

1. An anonymity algorithm-based data sharing privacy protection method implemented by a processor, comprising:

identifying, by the processor, privacy-related attributes of a structured medical data set;

performing, by the processor, semantic standardization and merging on the identified attributes by a Measurement Swiss-Army Knife (MSAK) anonymity algorithm, constructing a multi-semantic sensitive attribute classification tree, and calculating a minimum sensitive attribute difference;

constructing, by the processor, a virtual initial clustering center, and performing data set clustering and dividing on the identified structured medical data set and the multi-semantic sensitive attribute classification tree to obtain first subdata sets and a sensitive attribute difference matrix;

performing, by the processor, outlier detection and separation on the first subdata sets in parallel to obtain second subdata sets, and a first tuple set to be allocated and comprising outliers;

obtaining an anonymized data set, the obtaining the anonymized data set comprising:

setting, by the precessor, a parameter k of a k-Anonymity model and a parameter $\ell$ of a $\ell$-Diversity model, clustering the second subdata sets, aggregating tuples of the second subdata sets into a clustering cluster, and clipping and determining the clustering cluster according to a size, the parameter k and the parameter $\ell$ of the clustering cluster to obtain a first clustering cluster set, a second clustering cluster set and a second tuple set to be allocated;

determining whether the k-Anonymity model is met according to a number of the tuples in the clustering cluster; according to the sensitive attribute difference matrix, calculating an overall difference of sensitive attribute values of the clustering cluster, and determining whether the overall difference of the sensitive attribute values of the clustering cluster meets the $\ell$-Diversity model; and re-allocating, by the processor, the tuples in the tuple set to be allocated to the first clustering cluster set and the second clustering cluster set one by one, merging and adjusting remaining clustering clusters in the first clustering cluster set, and performing generalization and suppression.

2. The anonymity algorithm-based data sharing privacy protection method according to claim 1, wherein a step of identifying the privacy-related attributes of the structured medical data set comprises: determining all attributes in the structured medical data set that are required to be anonymized, and identifying explicit identifiers, quasi-identifiers and/or sensitive attributes, and processing the attributes respectively according to these types, wherein the quasi-identifiers comprise numeric type quasi-identifiers and classification type quasi-identifiers;

a distance of the numeric type quasi-identifiers is measured by a method for calculating Euclidean distance, Manhattan distance or Chebyshev distance; and a distance of the classification type quasi-identifiers is measured based on a corresponding generalization hierarchical structure tree.

3. The anonymity algorithm-based data sharing privacy protection method according to claim 2, wherein a step of constructing the virtual initial clustering center, and performing the data set clustering and dividing on the identified structured medical data set and the multi-semantic sensitive attribute classification tree comprises: counting a value of each of the quasi-identifiers or an occurrence frequency of each attribute value; arranging the numeric type quasi-identifiers according to numeric values in ascending order, arranging the classification type quasi-identifiers according to the occurrence frequency of each attribute value in a ratio ascending order, and forming sequences;

setting a number of the first subdata sets that are required to be divided to n, and selecting n values for each of the sequences at equal intervals;

making a value of each of the sequences corresponding to a central line of each part be the virtual initial clustering center;

comparing distances between all the tuples in the sequences and the clustering centers, comprising each tuple into a closest clustering cluster, and updating the clustering center of the clustering cluster; and recording to obtain non-repetitive sensitive attribute values, calculating a difference between every two sensitive attribute values and constructing the sensitive attribute difference matrix.

4. The anonymity algorithm-based data sharing privacy protection method according to claim 2, wherein a process of performing the outlier detection and separation on the first subdata sets comprises:

converting classification attribute values of the first subdata sets into dummy variable values according to the generalization hierarchical structure tree;

fitting data by an isolation forest algorithm, detecting outliers of the first subdata sets, and setting an outlier ratio parameter to o;

generating an outlier set, and comprising the outlier set into a tuple set to be allocated to generate the first tuple set to be allocated; and separating data in the outlier set from the first subdata sets to generate the second subdata sets.

5. The anonymity algorithm-based data sharing privacy protection method according to claim 1, wherein a process of clustering the second subdata sets comprises:

randomly selecting f tuples in the second subdata sets as clustering centers;

comparing distances between remaining tuples and all the clustering centers, comprising the tuples into a closest cluster, and updating the clustering center of the cluster;

for each clustering cluster, when the size of the clustering cluster is less than the parameter k, comprising the clustering cluster into the first clustering cluster set;

when the size of the clustering cluster is greater than the parameter k, separating distant tuples, retaining k tuples and determining whether the k tuples meet the $\ell$-Diversity model;

comprising the k tuples into the second clustering cluster set when the k tuples meet the $\ell$-Diversity model, or comprising the k tuples into the first clustering cluster set when the k tuples do not meet the $\ell$-Diversity model; and comprising the separated distant tuples into the second tuple set to be allocated;

when the size of the clustering cluster is equal to the parameter k, determining whether the clustering cluster meets the $\ell$-Diversity model; and comprising the clustering cluster into the second clustering cluster set when the clustering cluster meets the $\ell$-Diversity model, and comprising the clustering cluster into the first clustering cluster set when the clustering cluster does not meet the $\ell$-Diversity model, wherein $$f = \frac{g}{k},$$

and g represents a number of the tuples of a subdata set.

6. The anonymity algorithm-based data sharing privacy protection method according to claim 1, wherein a process of calculating the overall difference of the sensitive attribute values of the clustering cluster comprises:

acquiring the sensitive attribute difference matrix;

setting h sensitive attribute values in the clustering cluster, and calculating a sum of differences among the sensitive attribute values to obtain the overall difference of the sensitive attribute values of the clustering cluster; and normalizing the overall difference of the sensitive attribute values of the clustering cluster.

7. The anonymity algorithm-based data sharing privacy protection method according to claim 6, wherein the overall difference of the sensitive attribute values of the clustering cluster is expressed by a formula:

$$d = \sum_{i=1}^{h} \sum_{j=1, j \neq i}^{h} l_i l_j;$$

a step of normalizing the overall difference of the sensitive attribute values of the clustering cluster is expressed by a formula $$D = \frac{d}{h(h-1)},$$

wherein each element in the clustering cluster is required to be compared for h−1 times when the overall difference is calculated, wherein the ℓ-Diversity model is allowed to be met only by ensuring that ℓ−1 difference results are 1 in the h−1 times, which is expressed by a formula:

$$D_{min} = \frac{\ell - 1}{h - 1};$$

and when the overall difference D reaches or more, the overall difference of the sensitive attribute values in the clustering cluster is considered to meet the ℓ-Diversity model.

8. The anonymity algorithm-based data sharing privacy protection method according to claim 1, wherein the tuples in the tuple set to be allocated are allocated to the first clustering cluster set and the second clustering cluster set one by one based on a minimum cluster length binding principle, a difference-meeting binding principle and a minimum information loss principle, wherein the minimum cluster length binding principle means that when a number of the clustering clusters in the first clustering cluster set is greater than 0, the tuples in the tuple set to be allocated are allocated to the first clustering cluster set to ensure that the tuples are allowed for being eliminated from the first clustering cluster set and being comprised in the second clustering cluster set when a minimum length of each clustering cluster in the first clustering cluster set reaches k and the k-Anonymity model is met;

the difference-meeting binding principle means that the tuples are allowed for being eliminated from the first clustering cluster set and being comprised in the second clustering cluster set when the clustering clusters in the first clustering cluster set are comprised in the tuple set to be allocated and the ℓ-Diversity model is met; and the minimum information loss principle means that distances between the tuples set to be allocated and clustering centers of the clustering clusters are compared, the tuples are allocated to a closest cluster, the remaining clustering clusters in the first clustering cluster set are merged nearby until the k-Anonymity model and the ℓ-Diversity model are met, the clustering clusters are comprised in the second clustering cluster set, and otherwise, the clustering clusters are suppressed.

9. The anonymity algorithm-based data sharing privacy protection method according to claim 8, wherein all the tuples of the clustering clusters in the second clustering cluster set are replaced with the clustering centers, wherein each cluster generates an equivalent class, and each equivalent class is composed of a plurality of same tuples; a size of each equivalent class is the same as a size of a corresponding cluster; and equivalent classes jointly form an anonymized data set.

10. The anonymity algorithm-based data sharing privacy protection method according to claim 1, wherein the tuple set to be allocated comprises the first tuple set to be allocated and the second tuple set to be allocated.

* * * * *